United States Patent [19]

Kohl et al.

[11] Patent Number: 5,175,412
[45] Date of Patent: Dec. 29, 1992

[54] ELECTRICAL CONTROL SYSTEM FOR AN ELECTRICALLY HEATED WINDOW IN MOTOR VEHICLE

[75] Inventors: Walter Kohl, Bietigheim; Guenter Schramm, Vaihingen-Enzweihingen; Rolf Wenniger, Markgroeningen, all of Fed. Rep. of Germany

[73] Assignee: Robert Bosch GmbH, Stuttgart, Fed. Rep. of Germany

[21] Appl. No.: 775,722

[22] Filed: Oct. 11, 1991

[30] Foreign Application Priority Data

Nov. 15, 1990 [DE] Fed. Rep. of Germany ....... 4036363

[51] Int. Cl.⁵ ............................................. B60L 1/02
[52] U.S. Cl. ................................ 219/203; 219/503; 323/369; 374/152
[58] Field of Search ............... 219/491, 503, 505, 203, 219/522, 541, 543, 547; 323/366, 369, 355; 361/35, 37, 103, 106; 307/117, 132 E; 364/424.05, 557; 374/152

[56] References Cited

U.S. PATENT DOCUMENTS 4,555,743 11/1985 Kokubu et al. ...................... 361/196
4,780,619 10/1988 Campbell et al. ................. 307/10 R

FOREIGN PATENT DOCUMENTS 023946 2/1979 Japan ...................................... 361/37

Primary Examiner—Bruce A. Reynolds
Assistant Examiner—Michael D. Switzer
Attorney, Agent, or Firm—Michael J. Striker

[57] ABSTRACT

An electrical control system for an electrically heated window in a motor vehicle has a voltage source including a generator, a voltage regulator for regulating a generator output voltage, a transformer switched between the generator and a heating window, the generator output voltage being increased before supplying to the heatable window, and a unit for measuring a temperature of the transformer and interrupting a communication between the transformer and the voltage source in the event of exceeding an adjustable limiting temperature.

11 Claims, 1 Drawing Sheet

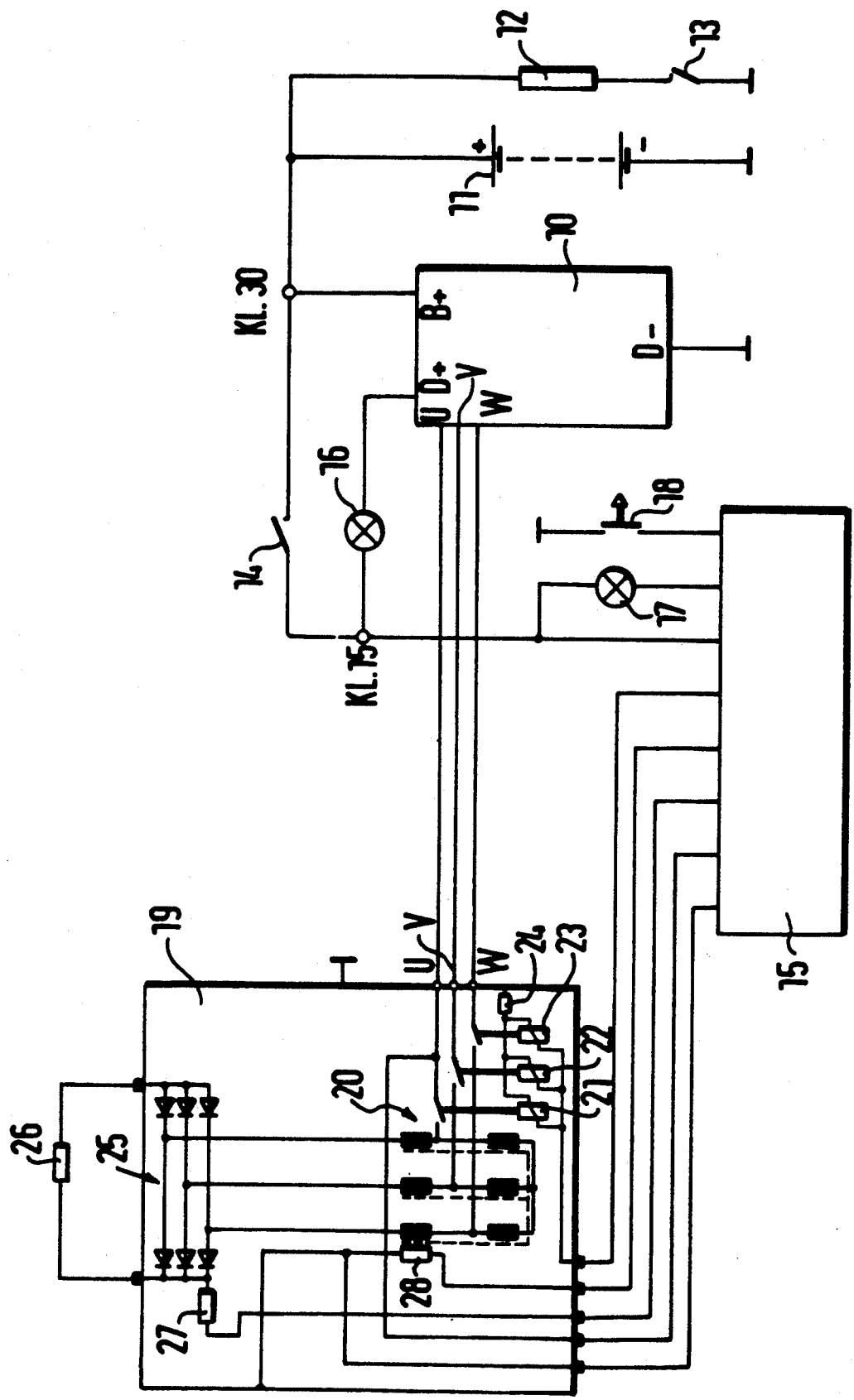

ELECTRICAL CONTROL SYSTEM FOR AN ELECTRICALLY HEATED WINDOW IN MOTOR VEHICLE

BACKGROUND OF THE INVENTION

The present invention relates to an an electrical control system for an electrically heated window (window pane) in a motor vehicle.

For the energy supply of a heatable window of a motor vehicle, it is advantageous that the voltage is significantly higher than the normal 12 volt provided in the motor vehicle by the battery voltage. Especially in connection with the heatable front window which must be defrosted before a drive, it is necessary to provide for a short time a very high power up to 2 kilowatt. This is possible only when the voltage which is available on the heating window amounts to at least 50-60 volts.

It is possible to produce such a voltage in a very simple manner when the 3-phase voltage produced by the generator is extra decoupled and for example is high transformed through a subsequently arranged transformer. An arrangement for window heating in a motor vehicle, in which such a voltage transformation is performed by means of an auto transformer, is disclosed in the U.S. Pat. No. 4,780,619. Here the high transformed voltage is rectified by a rectifying system, the rectified voltage is used to supply a heatable window. Since the window is supplied with a high power, it must be guaranteed that it is not overheated. It is therefore provided that the temperature of the window is monitored with a temperature sensor mounted on the window, and the heating is turned off when a maxium permissible temperature is reached. This arrangement however possesses the disadvantage that a separate temperature sensor in the region of the window must be arranged, and it is connected with the voltage regulator by a relatively long conductor. This long conductor is first of all cost unfavorable, and also can be interrupted and damaged. As a result the monitoring of the window temperature cannot be guaranteed in a reliable and efficient manner.

SUMMARY OF THE INVENTION

Accordingly, it is an object of the present invention to provide an arrangement for thermal monitoring of a vehicle window in a motor vehicle, which avoids the disadvantages of the prior art.

In keeping with these objects and with others which will become apparent hereinafter, the temperature of the transformer is measured, and when adjustable limiting temperature is exceeded, the connection between the transformer and the voltage source is interrupted.

When the arrangement is designed in accordance with the present invention it avoids the disadvantages of the prior art.

Due to the measurement of the temperature at the transformer and the simultaneous arrangement of the transformer in or on the voltage regulator, only a very short connecting conductor is required. With a suitable power determination of the power generator and the window it is guaranteed that the temperature process of the transformer can be undoubtedly connected with the temperature process of the window. It is simultaneously guaranteed that the transformer and the window heating can be turned on always simultaneously and therefore a reliable monitoring of the window temperature is possible.

In the present invention the transformer can be formed as an outer transformer.

The connection between the transformer and the three phase generator can be interrupted by three relays which are controlled by control elements.

The three phase generator can supply through one connection a regulating directing voltage for supplying a vehicle electrical system and through three outputs a three phase voltage for supplying the heating window.

The temperature measurements are performed at the transformer with a temperature sensor which is arranged near the transformer.

Also, a temperature fuse can be arranged near the transformer and operates so that in the event of exceeding a predetermined temperature the connection between the transformer and the three phase generator is interrupted by the relays.

The window heating can be turned on by a push button, and the control element can supply the turning-on signal to the relay only when an excitation of the generator is performed and recognized in the control element.

An indicating device can be provided to indicate the turned-on condition of the heating window.

The control element can interrupt the heating automatically when a breakage of the window is recognized by an over voltage, when the vehicle's electrical system voltage exceeds a predetermined value, and when a motor stoppage is recognized.

The heating can be automatically ended after a first heating time by the control part and all post-heating phases can be automatically ended after a second time which is significantly shorter than the first time.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing an arrangement for thermal monitoring of a heatable window in a motor vehicle.

DESCRIPTION OF A PREFERRED EMBODIMENT

An electrical control system for an electrically heated window in a motor vehicle includes a three-phase generator which is identified as a whole with reference numeral 10 and has at least connections B+, D+ and D−. The connection B+ is conventionally connected through a terminal KL30 with a plus pole of a battery 11 and also with a consumer represented by a resistor 12. The consumer is further connected to mass through a switch 13. The battery 11, the resistor 12 and the switch 13 symbolize in this circuit the whole vehicle electrical system.

The connection B+ is located after a not shown voltage regulator and an associated rectifier system. Thus, a regulated DC voltage is produced at the connection B+.

The connection D+ of the three-phase generator 10 is connected with a driving switch 14 through a charge indicating lamp and a further terminal KL15. The other connection of the driving switch is connected through terminal KL30 to the electrical system voltage. Furthermore, the terminal KL15 is connected with a control element 15 once directly and once through an indicating lamp 17. A push button 18 is located between the control element 15 and the mass and can be released with the predetermined switching process.

The control element 15 is connected through several conduits with a power unit 19, which through three further connections I, V, W is connected with corresponding three-phase connections U, V, W of the three-phase generator 10.

The control element 15 includes for example a microcomputer in which control and regulating processes take place to perform voltage comparison and to execute a time measurement.

The power unit 19 contains important components which include an autotransformer 10 connectable with the three-phase connection terminals U, V, W through three relays 21, 22, 23. The control connection of the relays 21, 22, 23 is connected with the control element 15, a further connection of the relay lies on mass through a temperature fuse 24, and the temperature fuse 24 is thermally connected with the winding of the outer transformer.

The output side of the output transformer 20 leads to a rectifier bridge 25. The rectifier bridge 25 rectifies the voltage which is supplied on the outer transformer 20 and increased relative to the vehicle electrical system voltage, and supplies the same to a heating window 26 through a plus or a minus connection.

The power unit 19 further contains a resistor 27 which is connected with a positive output of the rectifier bridge 25 on its one side, and is in communication at its other side with the control element 15. It also includes a temperature sensor 28 which is coupled thermally with the winding of the transformer 20 and is connected through two conductors with the control element 15. A further connection between the power unit 19 and the control element 15 extends from the connection U of the power unit 19 directly to the control element 15.

The embodiment shown in the drawing illustrated a separate arrangement of the generator 10, including the not shown voltage regulator, the control element 15, and the power unit 19. The actual arrangement can be also formed so that the regulator, the control element 15 and the power unit 19 are arranged spatially very close to one another. Especially the control element 15 and the power unit 19 must not be located far from one another so that no longer conductors are needed.

The operation of the device in accordance with the present invention shown in the drawing is as follows:

For defrosting and removing a coating on a window in a motor vehicle, for example on the windshield window, after the start a voltage which is higher than the vehicle electrical signal voltage is supplied to the heatable window 26 through the three-phase generator 10 and the connected transformer 20. Simultaneously, the three-phase generator 10 supplies through the connection B+ the remaining vehicle electrical system with a regulated DC voltage. The generator 10 acts in the electrical system as a voltage source for supplying a battery 11. The generator 10 acts in the electrical system as a voltage source for supplying the battery 11 and the consumer 12, including the heating window 26.

When the window heating is turned on by means of the push button 18, its actuation is communicated to the control element 15, then the relay 21, 22, 23 are controlled and the transformer is connected with the three-phase output of the three-phase generator 10. Therefore, in the control element 15 it is insured that the switching on of the transformer can be performed first after the excitation of the generator. After an end of this stage of the generator the control element 15 opens through the relay 21, 22, 23 the connection between the transformer 20 and the generator 10 again.

Usually the transformer 20 after the excitation of the generator remains however connected with the generator for a first heating time t1. The first heating time t1 amounts to approximately 1.5 minutes. After elapsing of this time, the control element 15 opens through the relay 21, 22, 23 the connection between the transformer 20 and the generator 10 and thereby ends the heating.

If after the first heating time t1 the window is completely defrosted, a new heating time t2 can start after actuation of the push button 19. It is however shorter than the first heating time and amounts approximately only to 0.5 minutes. After the second heating time t2, the control element 15 interrupts the connection between the transformer 20 and the three-phase generator 10.

When during the heating phase unacceptable operational conditions occur, for example motor stop with excessively high operational temperature at the transformer or overvoltage or undervoltage which can occur during a window break, this is recognized in the control element 15 and the control element 15 provides an interruption of the heating process. For recognition of the acceptable operational conditions, comparison is performed in the control element 15. During this comparison the supply data such as heating voltage, temperature of the transformer, battery voltage are compared with predetermined limiting values.

For performing the above functions by the control element 15, the heating voltage produced at the resistor 27 is supplied, the temperature sensor 28 supplies the temperature of the transformer 20, and through the terminal KL15 the control element 15 is supplied with the vehicle electrical system voltage or battery voltage.

When the heating window 26 is turned on, voltage is supplied through the control element 15 to the indicating lamp 17 and the lamp is turned on. If the heating operation of the control element 15 is interrupted, the indicating lamp 17 is turned off.

In the event of failure of the control element 15 the overtemperature which can occur at the transformer 20 releases a fuse 24 located near the transformer. Thereby the connection between the transformer 20 and the generator 10 is interrupted and the heating is interrupted independently of the operability of the control element 15.

For ensuring the operability of the thermal monitoring it is to be observed that the window heating and the transformer are always together in operation. This is guaranteed by the joint switching between the transformer 20 and the rectifier bridge 25 or the heating window 26 as shown in the drawing. By suitable power adjustment in the transformer 20 and heating window 26, it can be guaranteed that from the temperature process of the transformer the temperature process of the heating window can be undoubtedly concluded.

It will be understood that each of the elements described above, or two or more together, may also find a useful application in other types of constructions differing from the types described above.

While the invention has been illustrated and described as embodied in a device for thermal monitoring of a heatable window in a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims.

1. An electrical control system for an electrically heated window in a motor vehicle, comprising a voltage source including a generator; a voltage regulator for regulating a generator output voltage; a transformer switched between said generator and a heating window, the generator output voltage being increased before supplying to the heatable window; and means for measuring a temperature of said transformer and interrupting a communication between said transformer and said voltage source in the event of exceeding an adjustable limiting temperature, said transformer and said window being dimensioned so that a temperature measured at said transformer can be connected with a temperature of the heating window.

2. An electrical control system as defined in claim 1, wherein said transformer is formed as an outer transformer.

3. An electrical control system as defined in claim 1; and further comprising means for interrupting the communication between said transformer and said generator and including a control element and three relays controlled by said control element.

4. An electrical control system as defined in claim 1, wherein said generator is a three-phase generator having a connection through which it supplies a regulated DC voltage for supplying a vehicle system and outputs U, V, W at which a three-phase voltage is supplied to a heating window.

5. An electrical control system as defined in claim 1, wherein said temperature measuring means includes a temperature sensor which is arranged close to said transformer.

6. An electrical control system as defined in claim 3; and further comprising a temperature fuse which is arranged close to said transformer so that in the event of exceeding a predetermined temperature a connection between said transformer and said generator is interrupted through said relay.

7. An electrical control system as defined in claim 3; and further comprising a push button arranged to turn on a window heating, said control element delivering a switching-on signal to said relays only when an excitation of said generator is performed and recognized in said control element.

8. An electrical control system as defined in claim 1; and further comprising means for indicating that the heating window is turned on.

9. An electrical control system as defined in claim 1; and further comprising a control element which automatically interrupts the heating of the heating window when a breakage of the window is recognized by a corresponding overvoltage, when a vehicle electrical system voltage exceeds a predetermined lower value, or when a motor stoppage is recognized.

10. An electrical control system as defined in claim 1; and further comprising a control element which automatically ends heating of the heating window after a first heating time and automatically ends all post-heating phases after a second heating time, wherein the second heating time is significantly shorter than the first heating time.

11. The electrical control system for an electrically heated window in a motor vehicle, comprising a voltage source including a generator; a voltage regulator for regulating a generator output voltage; a transformer switched between said generator and a heating window, the generator output voltage being increased before supplying to the heatable window; and means for measuring a temperature of said transformer and interrupting a communication between said transformer and said voltage source in the event of exceeding an adjustable limiting temperature, said transformer and said window being arranged so that they can be switched on only together and are dimensioned so that a temperature measured at said transformer can be connected with a temperature of the heating window.

* * * * *